May 3, 1927.  
M. TAMINI  
1,627,126  
DRIVING ARRANGEMENT FOR MACHINES INSTALLED ON AUTOMOBILES  
Filed Aug. 29, 1921  2 Sheets-Sheet 2
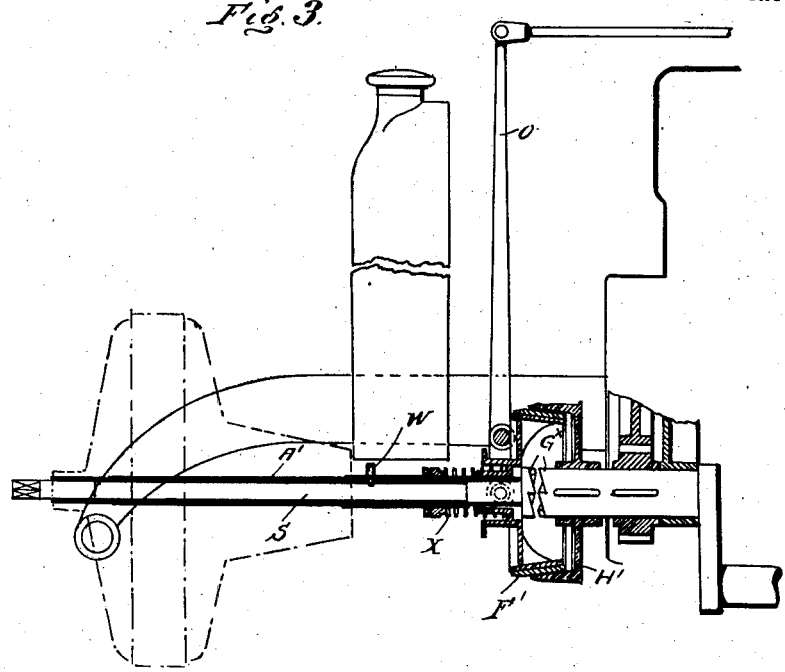
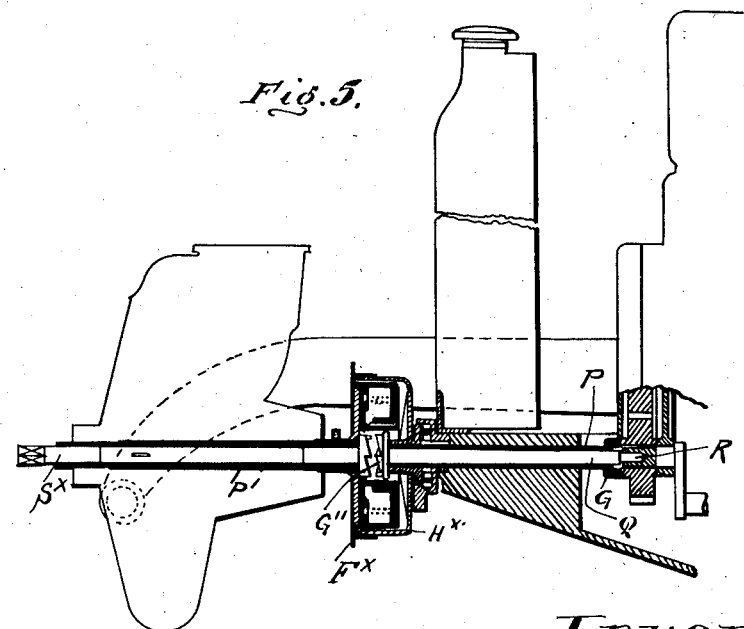
Inventor  
M. Tamini,  
By Marks & Clerk  
Attys.

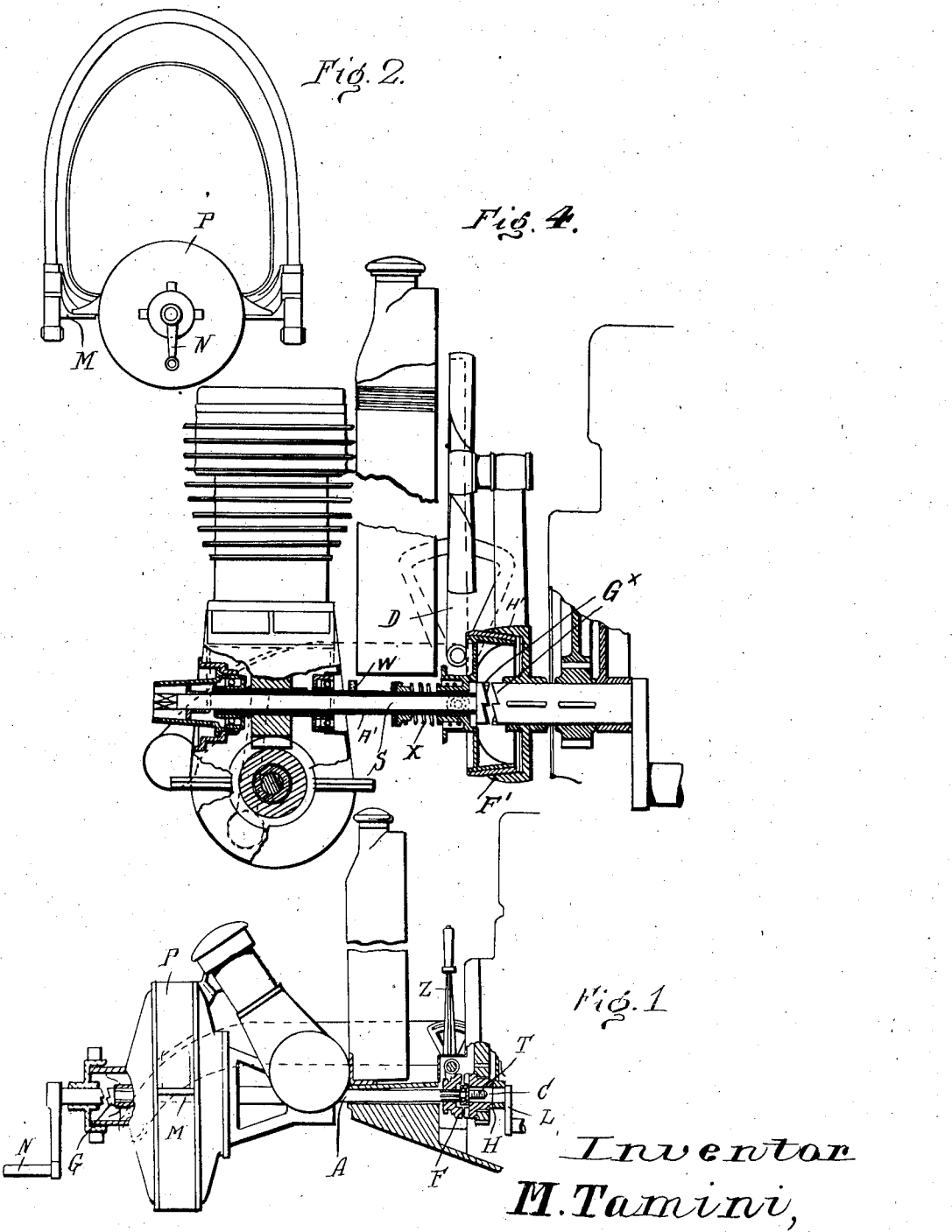

Patented May 3, 1927.

1,627,126

UNITED STATES PATENT OFFICE.

MARIO TAMINI, OF MILAN, ITALY.

DRIVING ARRANGEMENT FOR MACHINES INSTALLED ON AUTOMOBILES.

Application filed August 29, 1921, Serial No. 496,567, and in Italy March 30, 1921.

The present invention relates to an arrangement permitting of a centrifugal pump or other machine (dynamo, compressor, etc.) being driven direct by the engine of the automobile, the machine concerned, contrary to the general practice obtaining heretofore, being arranged on the forward portion of the automobile and precisely between the front ends of the longitudinal beams. The invention will be described in connection with the accompanying drawings in which:

Figure 1 is a side view partly in section of the front end of the frame of a motor car provided with one form of the invention.

Fig. 2 is a front view thereof with parts omitted.

Figs. 3 to 5 are views similar to Fig. 1 but illustrating alternative constructions embodying the same principle.

By arrangements according to the present invention the following important advantages are secured:

1. Standard automobile frames can be used without requiring from the manufacturers any special constructions or any modifications of the designs they are manufacturing in large lots.

2. A direct drive of the machines can readily be realized through the arrangements specified below, thus dispensing with the supplementary gears or chains and casings, long transmission shafts with their bearings, Cardan joints and control levers, etc. and achieving a simpler construction, a saving in manufacturing cost and up-keep as well as in power consumption, and a greater certainty of working.

3. The installation is rendered very easy and the drive, whether through a friction clutch or a claw and rigid clutch, can be effected by simple devices as set out hereunder.

4. The machine (pump, dynamo, compressor, etc.) is readily accessible for inspection maintenance and operation, there being no crowding of the body of the vehicle through coachwork parts or gears.

5. The coachwork floor is entirely available.

6. The load on the vehicle frame is in each case symmetrically distributed and balanced.

7. The driver or attendant has the engine and the driven machine close at hand, in his immediate vicinity and readily accessible.

8. The driven machine is not subjected to the heating effect of the air current that has traversed the radiator and engine. The cold air current drawn, by the fans with which all motor vehicles are equipped, into the engine hood through the radiator, may be used for cooling the cylinders of the compressors (Fig. 4) or other machines.

9. The erection, taking down, and replacement of the machine installed on the vehicle frame can be carried out readily and in a short time.

10. The driven machine (pump or other machine) serves as a protection to the radiator against collisions etc., such machines being generally stronger and less vulnerable than the radiator.

In the embodiment shown in Figs. 1 and 2, the pump P rests on two brackets M secured to the vehicle frame. The pump shaft A terminates at the rear in a Maltese cross engaging the sliding portion F of the claw-clutch whereas the fixed clutch-half H is secured to the conical end C of the main shaft L and is forced against the cone by a plug T inside which is lodged a ball bearing for the purpose of keeping the pump shaft A well centered. At its forward end the pump shaft A is provided with claws G for engagement with the starting handle N. To start the engine it is only necessary to bring into engagement the two halves of the claw-clutch F—H by means of the control lever Z and then to turn the crank handle N. Once the engine is started, the pump can be disconnected.

This arrangement is especially useful with vehicle frames in which the engine is supported at three points according to modern practice.

In the form of the invention shown in Figs. 3 and 4, the pump, whether centrifugal (Fig. 3) or reciprocating (Fig. 4) rests on brackets secured to the longitudinal girders, as in Figs. 1 and 2.

The pump shaft A' is hollow and at its inner end the sliding half of the cone clutch F' is arranged to slide on feathers, a spring X tending to force the sliding portion F' against the fixed half H' of the clutch. The control lever O in Fig. 3 and D in Fig. 4 serves to disconnect the two clutch halves against the pressure of the spring X. Inside of the hollow shaft A' a further shaft S is provided, whose rear end is fitted with claws for engagement with the claws of the engine shaft (see G×). With this arrangement the engine can obviously be started while the pump is disconnected, it only being necessary to turn the crank handle shaft S in the ordinary way. In order to prevent the inner shaft S from remaining stationary while the pump is running and thus giving rise to friction losses, a floating connection between the two parts is provided, consisting in a ball subjected to the pressure of a spring W.

In the embodiment of the invention shown in Fig. 5, a hollow shaft P fitted with claws G'' at its rear end is permanently engaged with the corresponding claws on the engine shaft. In order that the inclined claws may not work as on starting and thus cause the shaft P to revolve backwards, the claw joint is provided with two straight teeth. Inside of the hollow shaft P, a shaft Q is arranged to run loose, Q being made fast with the main shaft (whose forward end is fitted with the starting claws G'') by means of the threaded stem R. A friction (or other) clutch F$^x$—H$^x$ serves to connect at will the hollow shaft P with the likewise hollow shaft P' of the pump. Inside of the shaft P' is a shaft S$^x$ connected to the starting crankhandle (not shown). As will be readily seen, the described arrangement permits of the engine being started while the pump remains at rest, and of connecting up the pump at any desired moment.

Whether in any particular case the preference should be given to one rather than to any other of the three forms of my arrangement depends on the type, that is to say on the available space, of the vehicle frame concerned. In a like way, whether a friction or claw type clutch should be preferred depends on the requirements regarding the starting and running of the machine and also, again on the available space.

The described types are intended as mere examples of the various forms in which the invention may be carried into execution, it being understood that the constructional and form details may be varied from those described and illustrated within the spirit and scope of the invention.

It has been proposed heretofore to mount power delivering means on an auxiliary shaft at the front of a motor vehicle and to take power off of such means indirectly by a belt, chain or the like. In my invention, however, a machine for converting energy is mounted on the front of the motor vehicle and is directly driven by the engine shaft. It is therefore to be understood that the term "machine" in the claims, means energy converting mechanism such as a pump, compressor, dynamo and the like.

Having now particularly described and ascertained the nature of my said invention and in what manner the same is to be performed, I declare that what I claim is:—

1. In combination with a motor vehicle having its engine arranged at the front portion of the same, of a driven machine carried by the vehicle, located slightly forwardly of the engine and arranged between the side bars of the chassis of the vehicle, rigid shafting coaxial with the engine shaft and connected to said machine for directly driving the latter from the engine shaft, a clutch associated with said shafting to throw said machine into and out of operation while the engine is running, and separate means concentric with said shafting for cranking said engine from a point forwardly of said machine and independently of said shafting.

2. In combination with a motor vehicle having its engine arranged at the front portion of the same and its radiator in front of the engine, of a driven machine carried by the vehicle and located slightly forwardly of and in close proximity to said radiator, rigid shafting coaxial with the engine shaft and connected to said machine and the engine shaft for directly driving said machine from the engine shaft, a manually controlled clutch associated with said shafting to throw said machine into and out of operation while the engine is running, a second shaft concentric with said first shaft, means to associate said second shaft with said engine shaft independently of said second shaft whereby the engine may be cranked without turning said machine.

MARIO TAMINI.